(12) United States Patent
Li

(10) Patent No.: US 8,938,486 B2
(45) Date of Patent: Jan. 20, 2015

(54) COMPLEX DIVIDER AND ASSOCIATED METHOD

(75) Inventor: Yi-Lin Li, Hsinchu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 364 days.

(21) Appl. No.: 13/431,921

(22) Filed: Mar. 27, 2012

(65) Prior Publication Data
US 2012/0254276 A1 Oct. 4, 2012

(30) Foreign Application Priority Data
Mar. 31, 2011 (TW) .............................. 100111370 A

(51) Int. Cl.
G06F 7/487 (2006.01)
G06F 7/48 (2006.01)

(52) U.S. Cl.
CPC ................................... *G06F 7/4806* (2013.01)
USPC ......................................................... 708/650

(58) Field of Classification Search
None
See application file for complete search history.

(56) References Cited

U.S. PATENT DOCUMENTS

| | | | | |
|---|---|---|---|---|
| 5,844,943 A | * | 12/1998 | Kazecki et al. | 375/261 |
| 6,691,144 B2 | * | 2/2004 | Becker | 708/622 |
| 7,051,061 B2 | * | 5/2006 | Becker | 708/511 |
| 8,352,534 B2 | | 1/2013 | Chan | |
| 2003/0225809 A1 | * | 12/2003 | Becker | 708/622 |
| 2004/0139140 A1 | * | 7/2004 | Becker | 708/650 |
| 2012/0254276 A1 | * | 10/2012 | Li | 708/650 |

FOREIGN PATENT DOCUMENTS

TW 201011637 3/2010

OTHER PUBLICATIONS

Wang Jingcun et al., "Complex Divider FPGA Implementation Based on CORDIC Algorithm", 2008, p. 27-30, vol. 24, No. 287, Modern Electronics Technique, China Academic Journal Electronic Publishing House.

Li Quan et al., "The implementation of high-precision floating transcendental functions on FPGA based on the CORDIC algorithm", 2009, p. 166-170, No. 5, Application of Electronic Technique, China Academic Journal Electronic Publishing House.

* cited by examiner

Primary Examiner — David H Malzahn
(74) Attorney, Agent, or Firm — Winston Hsu; Scott Margo

(57) ABSTRACT

A complex divider utilized for dividing a first complex number by a second complex number to generate a computing result includes a computing unit and a dividing unit. The computing unit is utilized for receiving the first complex value and the second complex value, generating a third complex value according to the first complex value and the second complex value, and generating a real number according to the second complex value. The dividing unit is coupled to the computing unit, and is utilized for receiving the third complex value and the real number and dividing the third complex value by the real number to obtain the computing result.

4 Claims, 5 Drawing Sheets

COMPLEX DIVIDER AND ASSOCIATED METHOD

BACKGROUND OF THE INVENTION

1. Field of the Invention

The present invention relates to a complex divider, and more particularly, to a complex divider that does not comprise a multiplier.

2. Description of the Prior Art

Conventionally, steps for dividing a complex number Y by a complex number D are as follows:

$$\frac{Y}{D} = \frac{Yi + jYq}{Di + jDq}$$
$$= \frac{(Yi + jYq)(Di - jDq)}{(Di + jDq)(Di - jDq)}$$
$$= \frac{(YiDi + YqDq) + j(YqDi - YiDq)}{Di^2 + Dq^2}$$
$$= \frac{(YiDi + YqDq)}{Di^2 + Dq^2} + j\frac{(YqDi - YiDq)}{Di^2 + Dq^2}$$

where Y=Yi+jYq, D=Di+jDq, and $j=\sqrt{-1}$. A conventional complex divider needs six real multipliers and two real dividers, which increases the complexity of the design.

SUMMARY OF THE INVENTION

It is therefore an objective of the present invention to provide a complex divider that does not comprise a multiplier, such that the design complexity is lower than a prior art divider, to solve the above-mentioned problems.

According to one embodiment of the present invention, a complex divider utilized for dividing a first complex number by a second complex number to generate a computing result includes a computing unit and a dividing unit. The computing unit is utilized for receiving the first complex value and the second complex value, generating a third complex value according to the first complex value and the second complex value, and generating a real number according to the second complex value. The dividing unit is coupled to the computing unit, and is utilized for receiving the third complex value and the real number and dividing the third complex value by the real number to obtain the computing result.

According to another embodiment of the present invention, a method for dividing a first complex number by a second complex number to generate a computing result comprises: providing a computing unit which receives the first complex value and the second complex value, generates a third complex value according to the first complex value and the second complex value, and generates a real number according to the second complex value; and dividing the third complex value by the real number to obtain the computing result.

These and other objectives of the present invention will no doubt become obvious to those of ordinary skill in the art after reading the following detailed description of the preferred embodiment that is illustrated in the various figures and drawings.

DETAILED DESCRIPTION

Besides the calculating steps described in the prior art, steps for dividing the complex number Y by the complex number D can also be as follows:

$$\frac{Y}{D} = \frac{Yi + jYq}{Di + jDq}$$
$$= \frac{Yi + jYq}{|Di + jDq|e^{j\theta_D}}$$
$$= \frac{(Yi + jYq)e^{-j\theta_D}}{|Di + jDq|}$$
$$= \frac{\text{Re}\{(Yi + jYq)e^{-j\theta_D}\}}{|Di + jDq|} + j\frac{\text{Im}\{(Yi + jYq)e^{-j\theta_D}\}}{|Di + jDq|}$$

where Y=Yi+jYq, D=Di+jDq, $j=\sqrt{-1}$, and $\theta_D$ is a phase angle of the complex number D. The above calculating steps mainly indicate that the calculating result of (Y/D) is equal to:

$$\frac{(Yi + jYq)e^{-j\theta_D}}{|Di + jDq|}.$$

Figure 1:
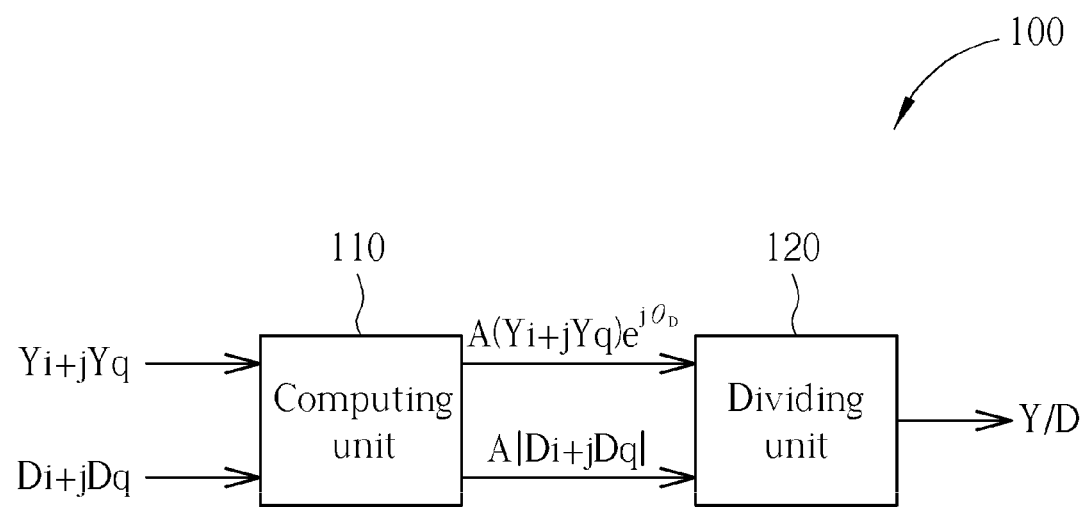
FIG. 1 is a diagram illustrating a complex divider according to one embodiment of the present invention.

Please refer to FIG. 1, which is a diagram illustrating a complex divider 100 according to one embodiment of the present invention. As shown in FIG. 1, the complex divider 100 includes a computing unit 110 and a dividing unit 120, and the complex divider 100 is used for dividing a first complex number Y (Y=Yi+jYq) by a second complex number D (D=Di+jDq) to generate a computing result (Y/D). In the operations of the complex divider 100, the computing unit 110 generates a third complex number $A(Yi+jYq)e^{-j\theta_D}$ according to the first complex number Y and the second complex number D, and generates a complex number whose real part approximating a real number A|Di+jDq| according to the second complex number D, where A is a coefficient. Then, the dividing unit 120 divides the third complex number $A(Yi+jYq)e^{-j\theta_D}$ by the real number A|Di+jDq| to obtain the computing result (Y/D).

Figure 2:
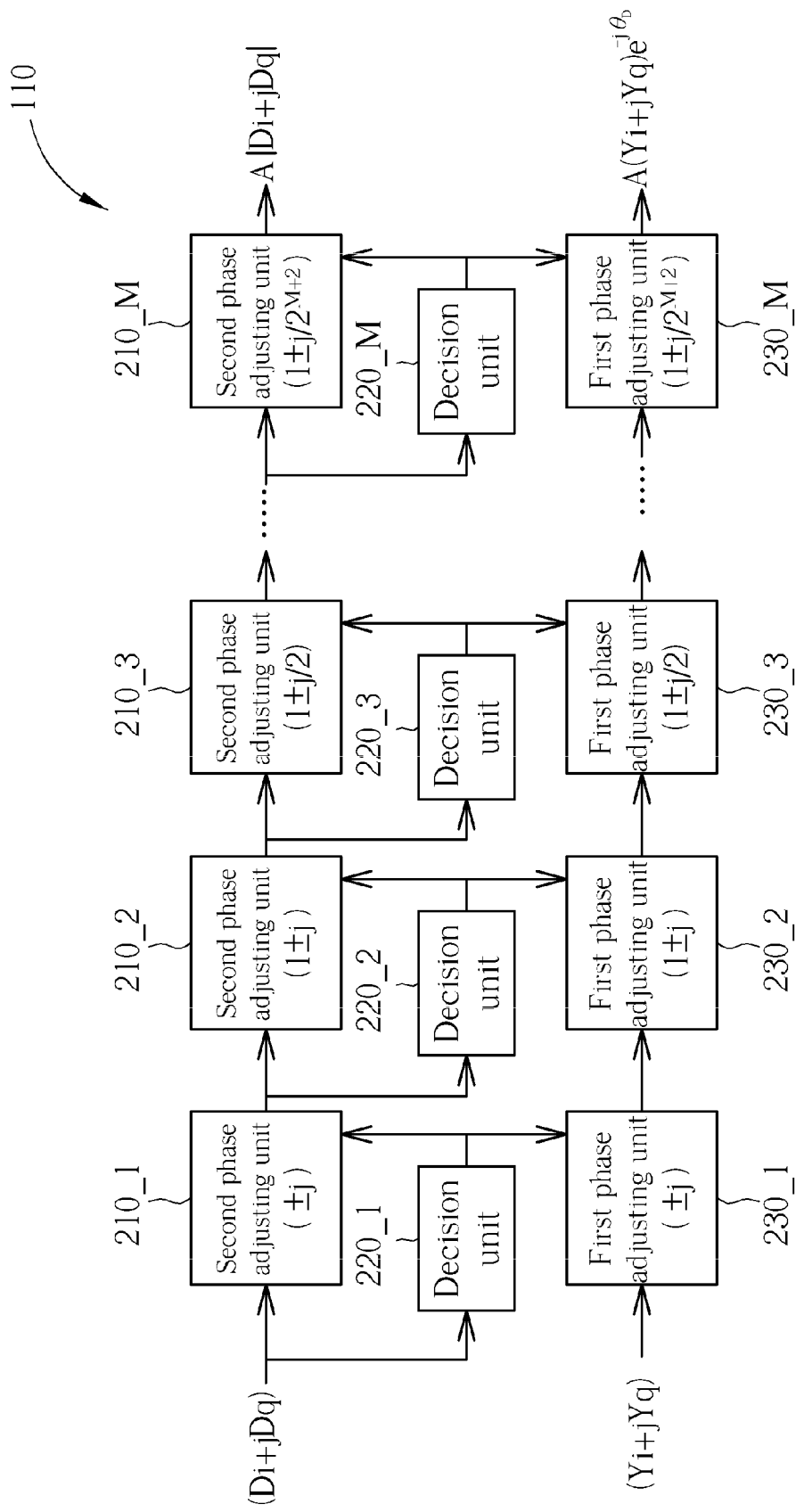
FIG. 2 is a diagram illustrating the computing unit shown in FIG. 1 according to one embodiment of the present invention.

Please refer to FIG. 2, which is a diagram illustrating the computing unit 110 according to one embodiment of the present invention. As shown in FIG. 2, the computing unit 110 includes second phase adjusting units 210_1-210_M, first phase adjusting units 230_1-230_M and decision units 220_1-220_M, where a phase adjusting value of the second phase adjusting unit 210_1 and the first phase adjusting unit 230_1 is equal to)(±90°), a phase adjusting value of the second phase adjusting unit 210_2 and the first phase adjusting unit 230_2 is equal to a phase angle of (1±j), a phase adjusting value of the second phase adjusting unit 210_3 and the first phase adjusting unit 230_3 is equal to a phase angle of (1±j (½)), . . . , and a phase adjusting value of the second phase adjusting unit 210_M and the first phase adjusting unit 230_M is equal to a phase angle of $(1\pm j(\frac{1}{2}^{M+2}))$.

Figure 3:
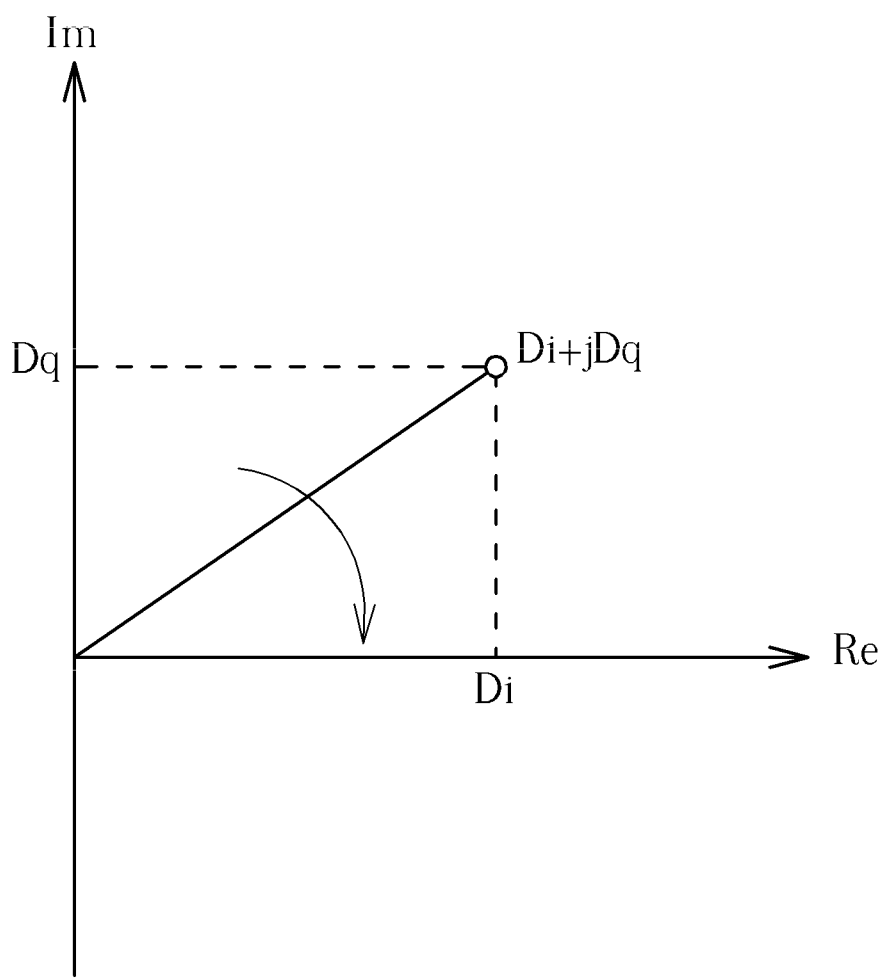
FIG. 3 shows how to adjust the phase of the second complex number D.

In the operations of the computing unit 110, the second phase adjusting unit 210_1 and the decision unit 220_1 receive the second complex number D, and the decision unit 220_1 determines the phase adjusting value of the second phase adjusting unit 210_1 to be (+90°) or (−90°) according to a phase of the second complex number D. In detail, the purpose of the second phase adjusting unit 210_1 is to adjust the phase of the second complex number D to be on the first quadrant or the fourth quadrant of a complex coordinate system as shown in FIG. 3. Then, the second phase adjusting unit 210_2 and the decision unit 220_2 receive an output of the second phase adjusting unit 210_1, and the decision unit 220_2 determines the phase adjusting value of the second phase adjusting unit 210_2 to be a phase angle of $(1+j)$ or $(1-j)$ according to a phase of the output of the second phase adjusting unit 210_1. In detail, the purpose of the second phase adjusting unit 210_2 is to make the phase of an input signal be closer to the real axis; that is, if the decision unit 220_2 determines that the phase of the input signal of the second phase adjusting unit 210_2 is on the first quadrant shown in FIG. 3, the phase adjusting value of the second phase adjusting unit 210_2 is the phase angle of $(1-j)$; and if the decision unit 220_2 determines that the phase of the input signal of the second phase adjusting unit 210_2 is on the fourth quadrant shown in FIG. 3, the phase adjusting value of the second phase adjusting unit 210_2 is the phase angle of $(1+j)$. Then, similarly, each of the second phase adjusting units 210_3-210_M adjusts the phase of its input signal to make the phase of its input signal be closer to the real axis. After being adjusted by the second phase adjusting units 210_1-210_M—that is the second complex number D is multiplied by $(\pm j)*(1\pm j)*(1\pm j/2)* \ldots *(1\pm j(\frac{1}{2}^{M+2}))$—the real part is almost equal to A|Di+Dq|, and the imaginary part is almost equal to 0. The phase of the second complex number D is shifted by $(-\theta_D)$, where $\theta_D$ is the phase angle of the second complex number D.

The first phase adjusting unit 230_1 receives the first complex number Y, and the phase adjusting value of the first phase adjusting unit 210_1 is determined to be (+90°) or (−90°) by the decision unit 220_1 according to the phase of the second complex number D, i.e. the first phase adjusting unit 230_1 and the corresponding second phase adjusting unit 210_1 have the same phase adjusting values. Similarly, the phase adjusting values of the first phase adjusting units 230_1-230_M are the same as the phase adjusting values of the second phase adjusting units 210_1-210_M, respectively. After being adjusted by the first phase adjusting units 230_1-230_M—that is the first complex number Y is multiplied by $(\pm j)*(1\pm j)*(1\pm j/2)* \ldots *(1\pm j(\frac{1}{2}^{M+2}))$—the first complex number Y becomes $A(Yi+jYq)e^{-j\theta_D}$. The phase of the first complex number Y is shifted by $(-\theta_D)$.

In light of the above, the computing unit 110 can output the third complex number $A(Yi+jYq)e^{-\theta_D}$ and the real number A|Di+jDq| at the same time. The dividing unit 120 then divides the third complex number $A(Yi+jYq)e^{-j\theta_D}$ by the real number A|Di+jDq| to obtain the computing result (Y/D). It is noted that the computing result may be a related better approximate value due to the limited hardware resources and representation.

Figure 4:
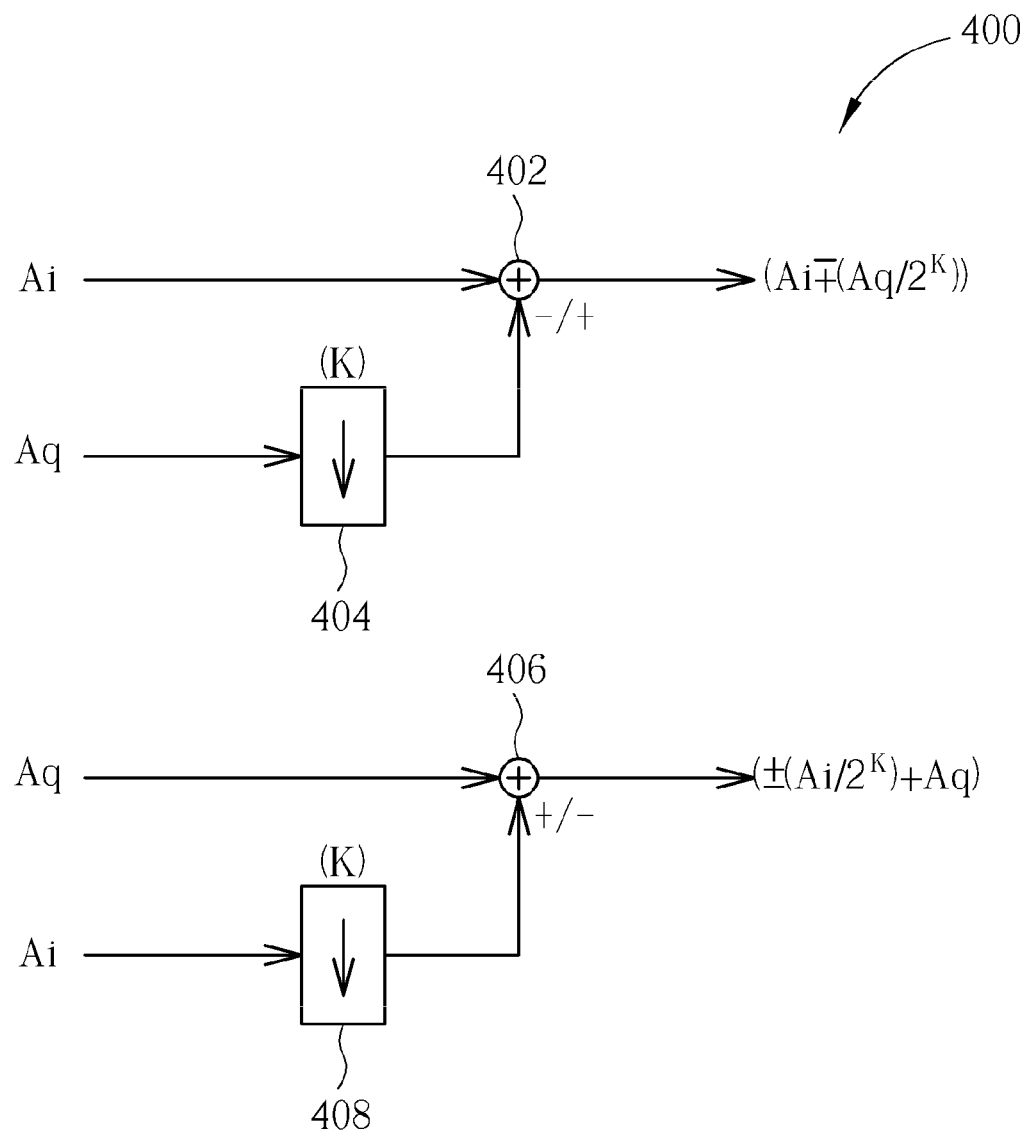
FIG. 4 is a diagram illustrating a phase adjusting unit according to one embodiment of the present invention.

Please refer to FIG. 4, which is a diagram illustrating a phase adjusting unit 400 according to one embodiment of the present invention, where the phase adjusting unit 400 can be implemented by a part of or the entire first phase adjusting units 230_1-230_M and the second phase adjusting units 210_1-210_M. As shown in FIG. 4, the phase adjusting unit 400 includes two adders 402, 406 and two bit shifters 404 and 408. In the operations of the phase adjusting unit 400, assuming that the input signal is (Ai+jAq) and the phase adjusting value is the phase angle of $(1\pm j(\frac{1}{2}^K))$, the adders 402 and 406 receive the real part and the imaginary part of the input signal, respectively, and the bit shifters 404 and 408 receive the imaginary part and the real part of the input signal, respectively. The adder 402 adds the real part to the bit-shifted imaginary part of the input signal to obtain a real part $(Ai\mp(Aq/2^K))$ of an output signal of the phase adjusting unit 400. The adder 406 adds the imaginary part to the bit-shifted real part to obtain an imaginary part $(\pm(Ai/2^K)+Aq)$ of the output signal of the phase adjusting unit 400.

In light of the above, because the complex divider 100 only requires the adders and bit shifters, the complexity of the complex divider 100 can be lowered. In addition, although the complex divider 100 needs two real dividers which may appear to be the same as the prior art, the numbers processed by the dividing unit 120 are smaller than in the prior art (i.e. the bit numbers of the divisor and the dividend are smaller), and therefore the complexity of the complex divider 100 can be further lowered.

Figure 5:
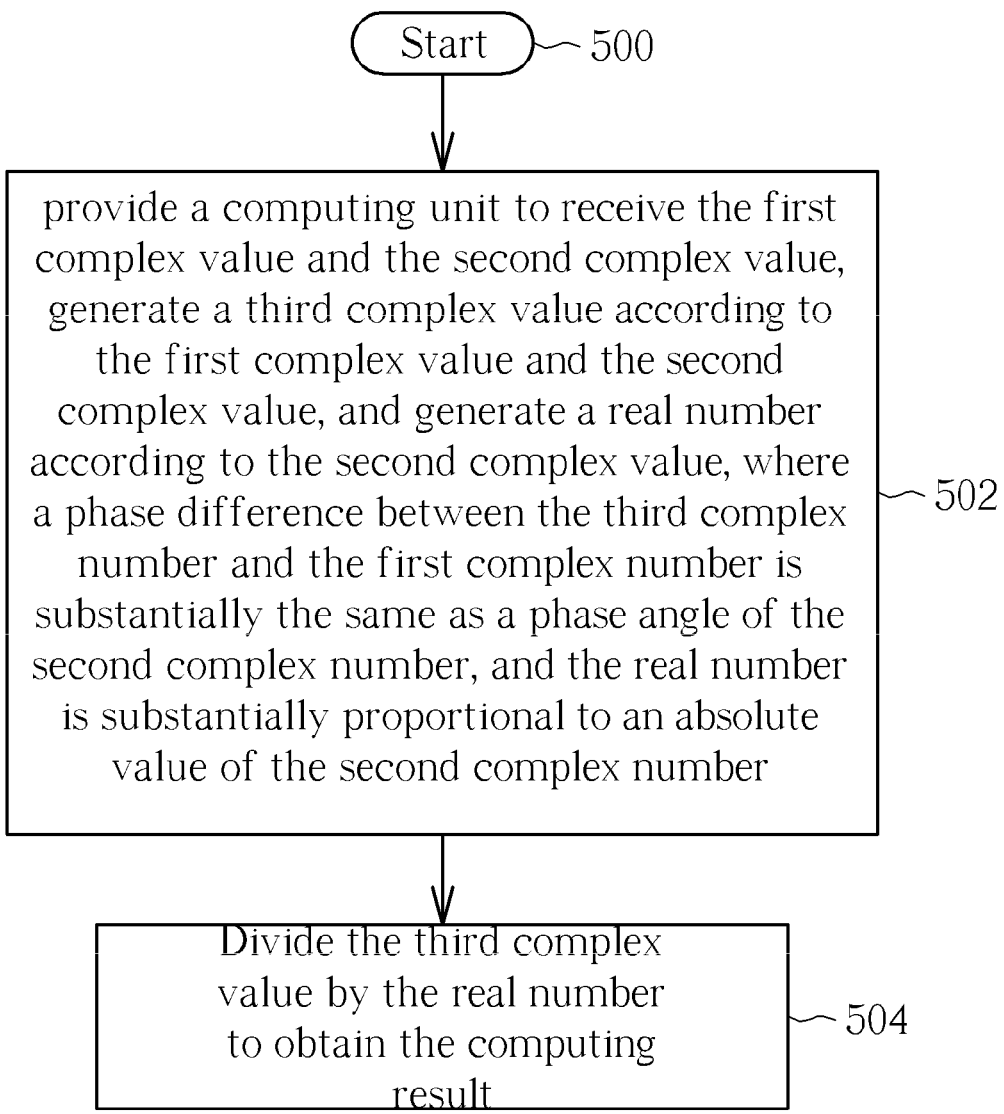
FIG. 5 is a flowchart of a method for dividing a first complex number by a second complex number to generate a computing result according to one embodiment of the present invention.

Please refer to FIG. 5. FIG. 5 is a flowchart of a method for dividing a first complex number by a second complex number to generate a computing result according to one embodiment of the present invention. With reference to FIGS. 1 and 5, the flow is described as follows:

Step 500: start;

Step 502: provide a computing unit to receive the first complex value and the second complex value, generate a third complex value according to the first complex value and the second complex value, and generate a real number according to the second complex value, where a phase difference between the third complex number and the first complex number is substantially the same as a phase angle of the second complex number, and the real number is substantially proportional to an absolute value of the second complex number; and Step 504: divide the third complex value by the real number to obtain the computing result.

Briefly summarized, in the complex divider of the present invention, the complex dividing calculation can be completed without using a multiplier, and the range of numbers processed by two real dividers within the complex divider is smaller than in the prior art. Therefore, the complexity of the complex divider is lower than in the conventional art.

Those skilled in the art will readily observe that numerous modifications and alterations of the device and method may be made while retaining the teachings of the invention.

What is claimed is:

1. A complex divider, for dividing a first complex number by a second complex number to generate a computing result, comprising:

a computing circuit, for receiving the first complex number and the second complex number, generating a third complex number according to the first complex number and the second complex number, and generating a real number according to the second complex number, wherein a phase difference between the third complex number and the first complex number is substantially equal to a phase angle of the second complex number, and the real number is substantially proportional to an absolute value of the second complex number; and a dividing unit, coupled to the computing circuit, for receiving the third complex number and the real number, and dividing the third complex number by the real number to obtain the computing result.

2. The complex divider of claim 1, wherein the computing circuit comprises:

a plurality of first phase adjusting circuits connected in series, wherein a leading first phase adjusting circuit receives the first complex number; and a plurality of second phase adjusting circuits connected in series, wherein the second phase adjusting circuits correspond to the first phase adjusting circuits, respectively, and a leading second phase adjusting circuit receives the second complex number;

wherein each of the second phase adjusting circuits adjusts a phase of its input signal according to the phase of its input signal; and each of the first phase adjusting circuits has a phase adjusting value the same as that of its corresponding second phase adjusting circuit.

3. The complex divider of claim 2, wherein at least two adjacent first phase adjusting circuits have phase adjusting values respectively equal to a phase angle of $(1\pm j(1/2^K))$ and a phase angle of $(1\pm j(1/2^{K+1}))$, where K is zero or a positive integer.

4. The complex divider of claim 2, wherein at least one of the first phase adjusting circuits comprises:

a first bit shifter, for bit-shifting an imaginary part of an input signal of the first phase adjusting circuit to generate a first bit-shifted value;

a first adder, for adding a real part of the input signal to the first bit-shifted value to generate a real part of an output signal of the first phase adjusting circuit; and a second bit shifter, for bit-shifting the real part of the input signal of the first phase adjusting circuit to generate a second bit-shifted value; and a second adder, for adding the imaginary part of the input signal to the second bit-shifted value to generate an imaginary part of the output signal of the first phase adjusting circuit.

* * * * *